United States Patent
Morard

(10) Patent No.: US 9,053,204 B2
(45) Date of Patent: Jun. 9, 2015

(54) METHOD FOR NAVIGATING WITHIN A SEARCH RESULT OBTAINED BY MEANS OF A SEARCH ENGINE

(75) Inventor: Jean-Pierre Morard, Rueil-Malmaison (FR)

(73) Assignee: SAGEMCOM BROADBAND SAS, Rueil-Malmaison (FR)

( * ) Notice: Subject to any disclaimer, the term of this patent is extended or adjusted under 35 U.S.C. 154(b) by 0 days.

(21) Appl. No.: 13/698,365

(22) PCT Filed: May 19, 2011

(86) PCT No.: PCT/EP2011/058112
§ 371 (c)(1),
(2), (4) Date: Nov. 16, 2012

(87) PCT Pub. No.: WO2011/144686
PCT Pub. Date: Nov. 24, 2011

(65) Prior Publication Data
US 2013/0066847 A1    Mar. 14, 2013

(30) Foreign Application Priority Data

May 20, 2010 (FR) ...................................... 10 53939

(51) Int. Cl.
*G06F 7/00* (2006.01)
*G06F 17/30* (2006.01)
(52) U.S. Cl.
CPC .... *G06F 17/30899* (2013.01); *G06F 17/30991* (2013.01)
(58) Field of Classification Search
CPC ..................... G06F 17/30899; G06F 17/30991; G06F 17/30575; G06F 3/04812

USPC ......... 707/705, 706, 707, 708, 710, 751, 765, 707/766, 768, 805, 607, 608, 690, 728, 729, 707/730, 731, 749, 758, 767, 780, 610, 620, 707/679, 722; 715/201, 203, 204, 255, 257, 715/258, 259, 261, 268, 271, 700, 738, 784
See application file for complete search history.

(56) References Cited

U.S. PATENT DOCUMENTS 6,271,840 B1   8/2001   Finseth et al.
6,356,908 B1   3/2002   Brown et al.

(Continued)

OTHER PUBLICATIONS

International Search Report as issued for PCT/EP2011/058112.

*Primary Examiner* — Greta Robinson
(74) *Attorney, Agent, or Firm* — Pillsbury Winthrop Shaw Pittman LLP

(57) ABSTRACT

A method for navigating within a search result obtained with a search engine installed on an electronic device, wherein a list of results is obtained from a data server, the navigation method including: identifying, in each result in the list of results, first components of the result considered, and second components of the result considered; organizing the first components into a first sub-list of results and the second components into a second sub-list of results; restoring the first sub-list of results into a first display area of the screen, and the second sub-list of results into a second display area of the screen; synchronizing the selection of a result in the first sub-list of results with the selection of a corresponding result in the second sub-list of results; and using a multi-touch interface in order to select a search result spread over a plurality of lists showing a different view of the same information.

7 Claims, 1 Drawing Sheet

(56) References Cited

U.S. PATENT DOCUMENTS

2004/0210842 A1* 10/2004 Qamar .......................... 715/538
2006/0059440 A1    3/2006 Pry
2006/0161535 A1*  7/2006 Holbrook ........................ 707/3
2007/0208669 A1*  9/2007 Rivette et al. ................... 705/59
2008/0250332 A1* 10/2008 Farrell et al. ................... 715/753

* cited by examiner

METHOD FOR NAVIGATING WITHIN A SEARCH RESULT OBTAINED BY MEANS OF A SEARCH ENGINE

CROSS REFERENCE TO RELATED APPLICATIONS

This application is the U.S. National Stage of PCT/EP2011/058112, filed May 19, 2011, which in turn claims priority to French Patent Application No. 1053939, filed May 20, 2010, the entire contents of all applications are incorporated herein by reference in their entireties.

TECHNICAL FIELD OF THE INVENTION

The object of the present invention is a method for navigating within a search result obtained by means of a search engine. The essential aim of the present invention is to improve the accessibility of the results of a data search launched by means of a search engine, particularly on the Internet.

The field of the invention, in general terms, is that of information searching on a communications network. The invention may be implemented on any communications network using search engines particularly throwing up visual information, for example visual information in thumbnail form. The invention will be described on the basis that the communications network under consideration is the Internet, the network a user accesses by means of an Internet browser; the network on which the user may carry out a search using a search engine. The invention may nevertheless be implemented on other types of networks, for example company Intranet networks.

PRIOR ART

More and more documents nowadays are digitized and accessible by means of search engines. An immediate consequence of the increase in the number of digitized documents accessible online is the increase in the number of results obtained when a search is carried out by means of an Internet browser, using key words, for example. Consequently, if the results obtained are relatively exhaustive in nature, it becomes more and more difficult for users to find the information they are looking for from within the list of results generated by the search. Certain search engines are able to produce a hierarchy of results found in order of relevance, but there is still always a manual stage that users must go through, in order to select the results that genuinely interest them from among the list of results obtained.

To make this manual stage easier, certain browsers which most commonly throw up a list of results in the form of a text line associated with a URL supplement the results generated by the search with a thumbnail-type image. The term "thumbnail" refers to a small-sized image enabling the result with which it is associated to be visually identified. For example, a thumbnail may comprise an image of a CD sleeve or a book cover, or it may be figure illustrating a patent if the search presents a patent document among its results. The size of the thumbnail is deliberately reduced, so that it can be positioned in the run of a text associated with the search result, for example, and so that it is still possible to display a relatively significant number of results onscreen simultaneously and visibly, even if this number is lower on account or the size of the thumbnails used than the number of results contained in a list of results without thumbnails. A thumbnail is typically characterized by a height of 84 pixels, which, for a standard screen with a display height of 600 pixels, makes it possible to display onscreen seven results with thumbnails from a list of results. In certain cases the thumbnail itself constitutes a result line in the search performed, this not being associated with a text line. A thumbnail may therefore appear either directly or in association with URL address information at the end of a search.

One difficulty persists, however. Indeed, with regard to the existing solutions, either a list of results is obtained, the number of which per screen is limited by the presence of thumbnails, as has just been explained, or a list of results without thumbnails, the list of results thereby containing a greater number of results, but almost invariably being less easy to read for users. Moreover, depending on the type of search performed or depending on the level awareness among users, it may be easier to search among the suggested results by consulting thumbnails rather than by consulting the list of results in their written form. These two cases in point illustrate the fact that when a search is made using a search engine, the search for and the discovery of the appropriate result or results in the list of results supplied by the search engine must be made easy.

GENERAL DESCRIPTION OF THE INVENTION

The method according to the invention proposes a solution to the problem that has just been described. In the invention a solution is proposed to improve the quality of a search performed by means of a search engine by limiting the time and effort required from users to access relevant information associated with their search. To this end, the invention envisages proposing a particular navigation through the search results; the particular navigation requires at least a first list of results and a second list of results to be compiled for each search, using a means of association between the results in each list of results. Advantageously, at least one of the lists of results is made up of a set of thumbnails.

Navigation through a list of results is the term used to describe the ability to move a cursor within a list or a sub-list of results and/or to select one or a plurality of results within the list of results generated by the search.

The invention therefore essentially relates to a method for navigating within a search result obtained by means of a search engine installed on an electronic device, wherein a list of results is obtained from a data server, characterized in that the navigating method comprises the various following steps consisting of:

identifying in each result in the list of results first components of the result considered and second components of the result considered;

organizing the first components into a first sub-list of results and the second components into a second sub-list of results;

restoring the first sub-list of results into a first display area of the screen and the second sub-list of results into a second display area of the screen;

synchronizing the selection of a result in the first sub-list of results with the selection of a corresponding result in the second sub-list of results.

The method according to the invention may comprise in further principle stages, which were mentioned in the last paragraph, one or a plurality of additional characteristics from among the following:

the first sub-list of results is made up of thumbnail-type elements;

the second sub-list is made up of components organized in a table;

the restoration stage of the first sub-list into the first display area of the screen is carried out in groups, each group comprising a first limited number of first components; the restoration stage of the second sub-list into the second display area of the screen is carried out in groups, each group comprising a second limited number of second components;

the stage involved in obtaining the list of results from a data server is carried out by receiving a first set of results, a second set of results being obtained from the data server only after groups not included in the first set of results have been requested;

the method includes a synchronization stage of the restoration of the groups of results, each group of one of the two sub-lists restored into the display area associated with it exhibiting a corresponding group in the group of the other of the two sub-lists restored into the display area associated with it;

the first display area and the second display area include a first navigation means in the results of the first sub-list of results and a second navigation means in the results of the second sub-list of results, respectively;

the first navigation means and the second navigation means are synchronized, in other words a change in selection of one of the elements of one of the sub-lists by means of a first means of synchronization brings about a change in the selection of an element in the other sub-list, such that the selected elements are corresponding elements.

The different additional characteristics of the method according to the invention, insofar as they are not mutually exclusive, are combined according to all the association possibilities, leading to different exemplary embodiments of the invention.

The invention and its different applications can be better understood by reading the following description and examining the accompanying figures.

BRIEF DESCRIPTION OF THE FIGURES

These are only presented as a rough guide and are in no way intended to limit the invention. The figures show.

DESCRIPTION OF PREFERRED EMBODIMENTS OF THE INVENTION

Elements appearing in different figures will retain the same reference numbers, unless stated otherwise.

Figure 1:
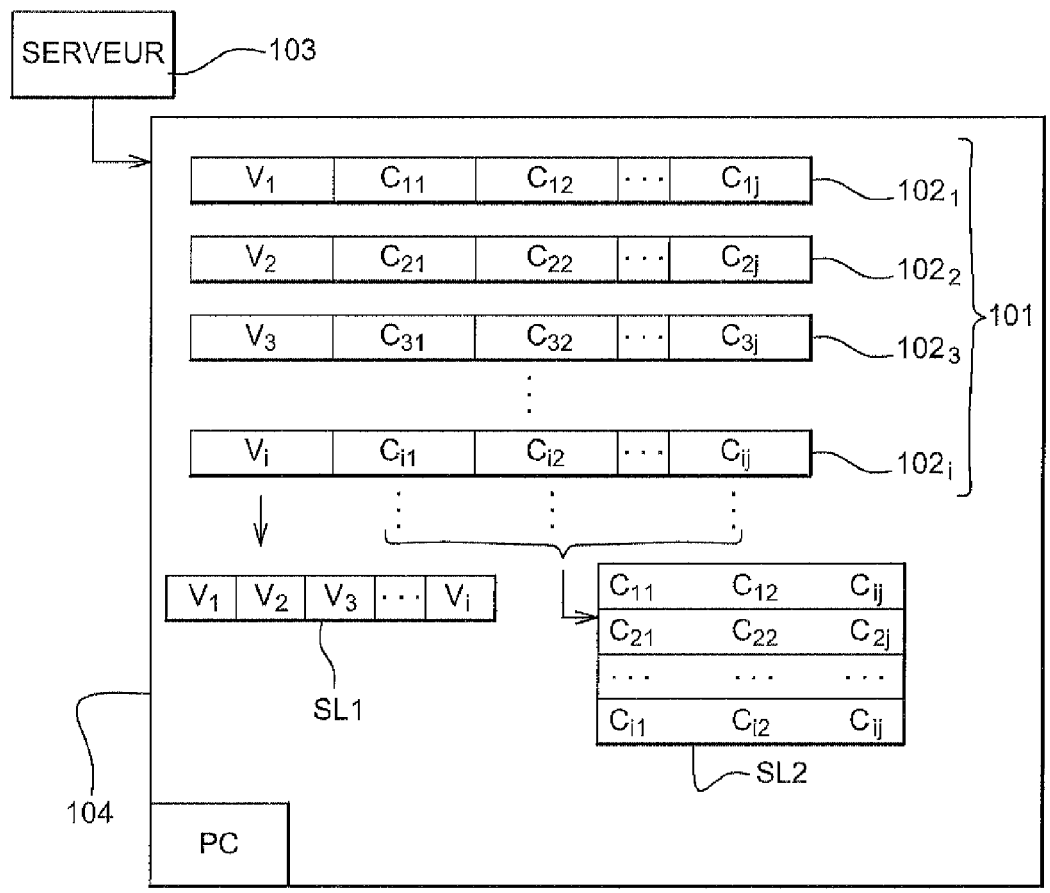
in FIG. 1, a schematic representation of the data organisation resulting from a search performed by means of a search engine, allowing an embodiment of the method according to the invention.

FIG. 1 represents in schematic form a list of results 101 comprising a plurality of results 102 which are transmitted from a remote data server 103 to an electronic device 104, for example a person computer. Depending on the embodiments the invention, it is envisaged that a certain number of results 102$i$ in the list of results 101 will be memorized in the electronic device 104, i being a natural number serving to locate the result in the list of results 101, the non-memorized results being transmitted from the server 103 to the electronic device 104 depending on the navigation events of the method according to the invention, as described above.

Each result 102$i$ comprises a certain number of components, each of the components corresponding to a piece of information capable of identifying the result being considered.

Hence, each result 102$i$ comprises a first component Vi, i being a natural number corresponding to the number of the result being considered in the list of results 101. In an exemplary embodiment of the method according to the invention, the first components are regarded as information associated with a thumbnail element. It is possible that the first component Vi contains no data, in which case the type of information associated with said first component is not available for the result considered. In a particular embodiment, every first component Vi may exhibit a plurality of fields which are not represented; each of the fields considered of the first components Vi advantageously corresponds to a piece of information identifiable by a user when it appears, for example, in a banner, a sequence of thumbnails. By way of example, one of the fields corresponds to the title associated with the thumbnail, said title field being dynamically displayed when the user browses the thumbnail. In another example, one of the fields is made up of a hypertext link which can be clicked on, for example in order to navigate to a page associated with the hypertext link.

Each considered result 102$i$ moreover comprises a second component Ci, every second component Ci being able to present a plurality of fields j; each of the fields j of the second component Ci advantageously corresponds to a piece of information that can be identified by a user when it is included in a table, for example.

In the method according to the invention, it is proposed that a first sub-list SL1 and a second sub-list SL2 should be compiled from the list of results 101, these comprising the first components Vi and the second components Ci respectively.

Figure 2:
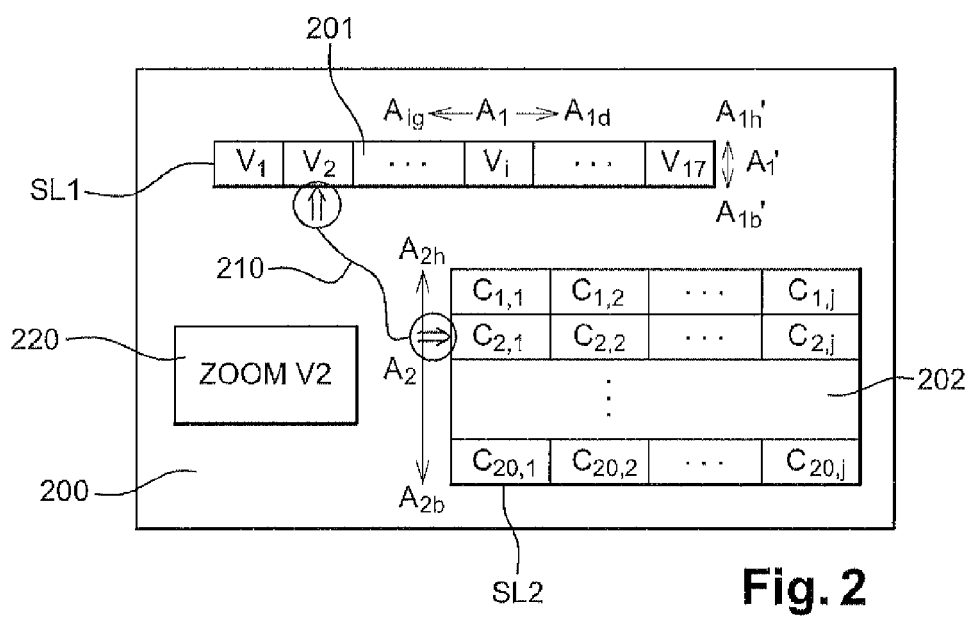
in FIG. 2, a schematic representation of an exemplary embodiment of the method according to the invention.

As illustrated in FIG. 2, the first sub-list SL1 is restored into a first display area 201 of a screen 200 associated with the electronic device 104, while the second sub-list SL2 is restored into a second display area 202 of the screen 200.

The invention advantageously provides that the sub-lists SL1 and SL2 are made up of groups of results which do not necessarily include the same number of restored elements at a given instant under consideration. Groups of results refer to a set of elements in a sub-list which can be simultaneously displayed in the display area associated with them. Hence, for example, the first sub-list SL1 may be made up of groups of 17 thumbnails Vi, while the second sub-list SL2 may be made up of groups of around 25 lines of metadata, in other words of distinct fields presented in information lines, advantageously in the form of a table.

However, if the number of elements in the groups in the two sub-lists is not identical, it is provided in the invention that the set of elements in the groups in the sub-list including the fewest elements find their corresponding element in the group displayed of the other sub-list of results. Two elements or two results in a sub-list are said to be corresponding if the information included in them comes from a same result 102$i$ in the list of results 101 and most commonly from different components of the result being considered 102$i$.

It is advantageously provided in the invention that the sub-lists SL1 and SL2 each exhibit a different navigation means, for example scrollbar navigation. Hence, in the example represented, the first sub-list SL1 exhibits a first horizontal scrollbar A1, controllable in a first direction A1$d$ and a second direction A1$g$ allowing movement within a group in the first sub-list SL1 and a first vertical scrollbar A1' controllable in a first direction A1$b'$ and a second direction A1$h'$ to move from one group to the next in the first sub-list SL1 and the second sub-list SL2 exhibits a second vertical scrollbar A2 controllable in a first direction A1$h$ and a second direction A1$b$ to move from one group to another in the second sub-list SL2.

According to the invention, when a result from one of the sub-lists SL1 or SL2 is selected by a user, by means of a mouse and/or using the scrollbars A1 or A2, for example, the corresponding result in the other sub-list SL1 or SL2 is likewise automatically selected. This automatic selection constitutes a synchronization operation 210 of the selection operations from one sub-list to the other. The direct selection or selection by synchronization of a result in the sub-lists may be translated in various ways: for example, the selected result may be enlarged, highlighted, framed, emboldened or undergo any operation enabling it to be distinguished from the other results that have not been selected; in all cases, one refers to the positioning of a cursor on the result being considered. Two cursors are therefore permanently displayed: one for each sub-list.

Advantageously, the selected result is displayed in enlarged form in an individual display window 220 on the screen 200. The result zoomed in in this way may include information already presented in the sub-lists SL1 or SL2 of said selected result or provide complementary information. A synthesized view of the selected element is therefore offered. An alternative way of depicting the selected result, in order to benefit in terms of display surface and visual effort, involves displaying the window 220 in a position relative to the selected element superposed on one of the two sub-lists, for example from the lower left corner of the selected element in the second display area 202. The most appropriate corner for masking the minimum amount of information is therefore re-evaluated with each new selection.

When a group of results is requested, for example by means of the scrollbars mentioned above, and when this group of results has not yet been transmitted from the remote server, a request such as an http request is sent from the electronic device 200 to the server 103 to recover the following groups from the list of results 101. This request is advantageously anticipated, so that the user does not have to wait for the server to respond when the time comes. A local cache is advantageously used, so that data that has already been consulted is not requested again within a reasonable period of around an hour.

The example that has been described focuses on a case in which two sub-lists are presented, but the range of the invention extends to a presentation in n sub-lists, each exhibiting a cursor and display synchronization between them.

The invention claimed is:

1. A method for navigating within a search result obtained from a search engine installed on an electronic device, wherein a list of search results is obtained from a data server, the navigating method comprising:

identifying, for each result in the list of search results, first components of the result and second components of the result;

organizing the first components of each result into a first sub-list of results and the second components of each result into a second sub-list of results;

restoring the first sub-list of results into a first display area of a display screen associated with the electronic device and the second sub-list of results into a second display area of the display screen, in which each group in the first and second sub-list of results comprises a limited number of first group components and second croup components that correspond to each other and are displayed in the first and second display areas, respectively;

synchronizing a selection of a result in the first sub-list of results with a selection of a corresponding result in the second sub-list of results, wherein the synchronizing of the selection of the result comprises, when the result is selected in one of the first sub-list of results and the second sub-list of results, automatically selecting the corresponding result in the other sub-list of results; and synchronizing the restoration of the groups of results, in which each group of one of the two sub-lists restored into the display area associated with it exhibits a corresponding group in the group of the other of the two sub-lists restored into the display area associated with it.

2. The method according to claim 1, wherein the first sub-list of results is made up of thumbnail-type elements.

3. The method according to claim 1, wherein the second sub-list is made up of components organized in a table.

4. The method according to claim 1 wherein the list of results is obtained from the data server by receiving a first set of results, a second set of results being obtained from the data server only after groups not included in the first set of results have been requested.

5. The method according to claim 1, wherein the first display area includes first navigation means configured for two-dimensional navigation of the first sub-list of results and the second display area includes second navigation means configured for single-dimensional navigation of the second sub-list of results.

6. The method according to claim 5, wherein the first navigation means includes a first horizontal scrollbar and a first vertical scrollbar for directionally navigating through the first sub-list of results and the second navigation means includes a second vertical scrollbar for directionally navigating through the second sub-list of results.

7. The method according to claim 5, wherein the first navigation means and the second navigation means are synchronized.

* * * * *